J. North,
Sawing Stone.
Nº 15,892. Patented Oct. 14, 1856.
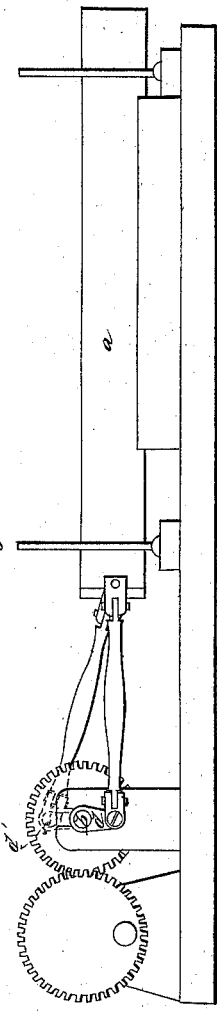
Fig. 1.
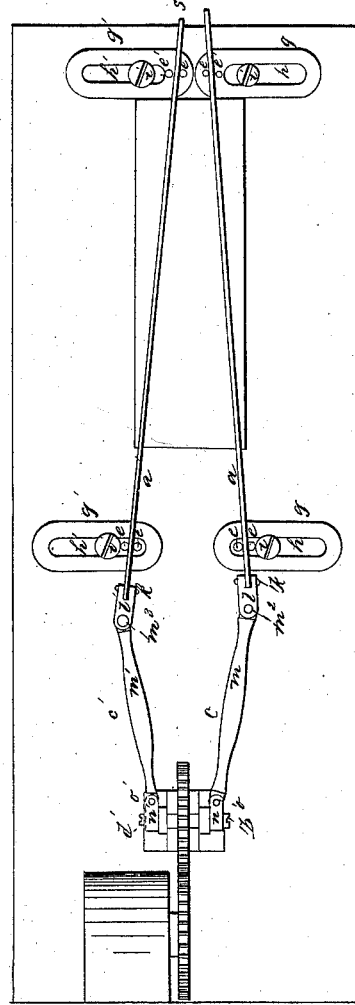
Fig. 2.
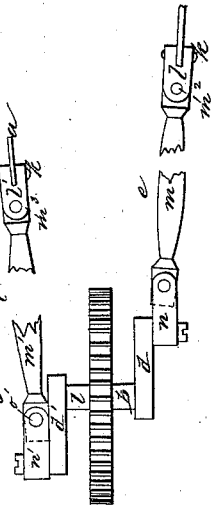
Fig. 3.
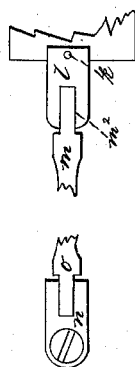
AM. PHOTO-LITHO. CO. N.Y. (OSBORNE'S PROCESS)

UNITED STATES PATENT OFFICE.

JNO. NORTH, OF MIDDLETOWN, CONNECTICUT.

SAWING STONE.

Specification of Letters Patent No. 15,892, dated October 14, 1856.

*To all whom it may concern:*

Be it known that I, JOHN NORTH, of Middletown, in the county of Middlesex and State of Connecticut, have invented an Improvement in Machines for Sawing Marble Slabs, and that the following is a full, clear, and exact description of the principle or character which distinguishes it from all other things before known and of the usual manner of making, modifying, and using the same, reference being had to the annexed drawings, Figure 1 representing a side elevation; Fig. 2, a plan of operation; Fig. 3, detached parts of the joints, &c.

My invention consists in so arranging and operating two reciprocating alternating saws as to saw two tapering sides of a slab of marble or stone at one operation, both saws being connected with one and the same driving shaft.

The saw blades $a$, $a'$ are connected with the crank shaft $b$ by means of jointed connecting rods $c$, $c'$ and cranks $d$, $d'$. The saw blades have suitable vertical guides $e$, $e$ $e$, $e'$ $e'$ $e'$ $e'$ and there may be more guides if necessary. These guides are affixed to adjustable blocks $g$, $g$, $g'$, $g'$ made adjustable by means of slots $h$ $h$ $h'$ $h'$ and screws $i$ $i$ $i'$ $i'$. The saws are connected by joints $k$ $k'$ giving vertical play to the short sections $l$ $l'$ of the connecting rods and these sections are connected with the main portions $m$ $m'$ of the connecting rods by joints $m^2$ $m^3$ giving horrizontal play and these main portions are again connected with short sections $n$ $n'$ by joints $o$, $o'$ giving horizontal play, and these short sections are connected with the cranks $d$, $d'$. The short sections and main portions form connecting rods having each four joints, viz. the joints $k$, $k'$, the joints $m^2$ $m^3$, joints $a$ $o'$ and the joints of the connecting rods and crank pins. The joints giving horizontal play are to accommodate the oblique motion of the saws. The saws may be adjusted to parallelism for ordinary straight sawing or they may be varied and adjusted to different angles for oblique work.

This machine involves the full capacity of the straight saws now in use as well as the improvement claimed.

What I claim as my invention for sawing two inclined sides of a slab of marble or stone at one operation is—

The two inclined reciprocating saws connected with one and the same rotating driving shaft, by the oblique connecting rods $c$, $c'$, each rod having four joints, as they are set forth, the whole being arranged and operating in the manner and for the purposes herein set forth.

I wish it to be understood that I consider the four joints are indispensable to the practical working of my machine, and although other means may be devised for accommodating the various motions required, yet I am not aware of any other that is in every respect the equivalent of my mode.

JOHN NORTH.

Witnesses:
R. T. CAMPBELL,
S. G. BOOTH.